E. N. BACHELDER.
TEA INFUSER.
APPLICATION FILED AUG. 17, 1910.

996,305.

Patented June 27, 1911.

Inventor:
Elmer N. Bachelder
by S. W. Bates
Atty.

Witnesses:

UNITED STATES PATENT OFFICE.

ELMER N. BACHELDER, OF PORTLAND, MAINE.

TEA-INFUSER.

996,305.     Specification of Letters Patent.     Patented June 27, 1911.

Application filed August 17, 1910. Serial No. 577,632.

*To all whom it may concern:*

Be it known that I, ELMER N. BACHELDER, of Portland, in the county of Cumberland and State of Maine, have invented certain new and useful Improvements in Tea-Infusers, of which the following is a specification.

My invention relates to a device for cooking food substances which require to be submerged in hot or boiling water a limited length of time but it is especially designed for preparing infusions of tea.

In the preparation of tea according to the best authorities the tea leaves should be submerged in freshly boiled water for a period of from 4 to 5 minutes and should then be removed. During this time the desirable elements of the tea are practically all dissolved but if left longer in the water the tannic acid and other deleterious substances contained in the tea leaves are dissolved by the water and added to the infusion.

My device is designed to provide means for submerging tea leaves and other forms of food for a given time and then automatically removing them from the water whereby overcooking is prevented.

It consists essentially of a float which supports a food receptacle freely open to the water in the main tank and above the food receptacle an auxiliary tank having a perforated bottom adapted to slowly drain off its contents. When the tank is filled with water, the float and the food receptacle are submerged but when the tank becomes empty by the draining off of its water, then the float rises and lifts the food receptacle above the water.

I illustrate my invention by means of the accompanying drawing which shows a tea pot or infuser constructed according to my invention.

Figure 1:
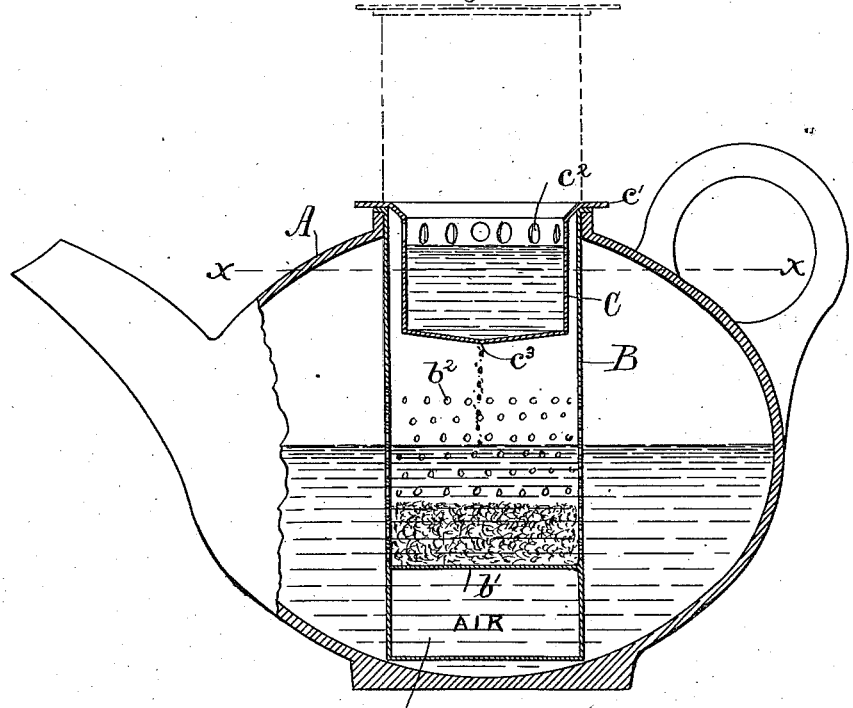
Figure 2:
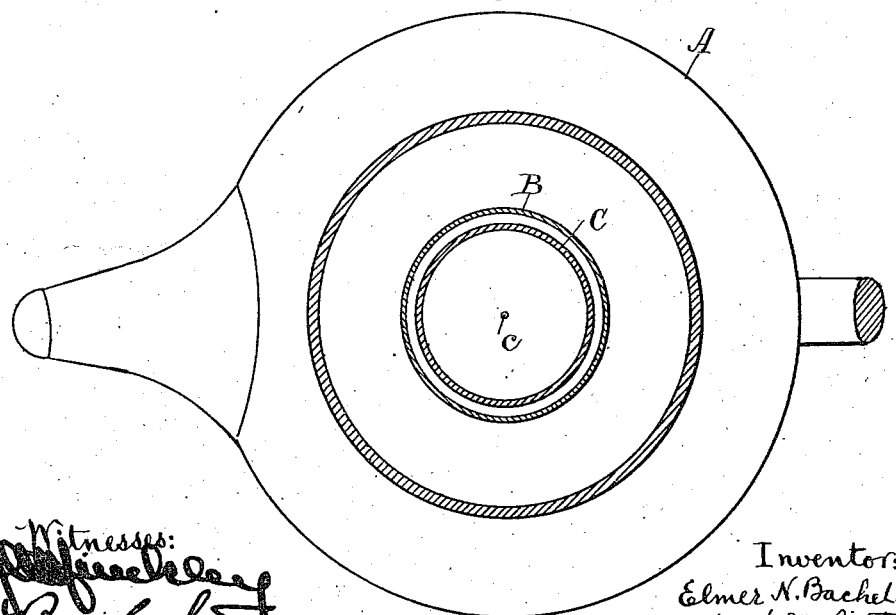

In the drawing Figure 1 is a vertical section and Fig. 2 is a horizontal section on the line $x$ $x$ of Fig. 1.

A represents a tea pot or other vessel for containing the heated water and as here shown it has the usual mouth or opening in the top.

I provide a float for supporting the tea leaves or other food above the level of the water and a tank of sufficient capacity to sink the float when wholly or partially filled with water. As here shown, I constructed these moving parts in the form of a cylinder B which fits in the mouth of the pot A and is guided vertically by its contact with the sides of the mouth so that it will be free to move up and down and will always maintain a substantially vertical position. On the lower end of the cylinder I form an air chamber or float $b$ by means of a diaphragm $b'$ placed a sufficient distance above the bottom. As here shown, the top of this cylinder is open and its sides above the air chamber are perforated so that the water can pass freely through. The space above the float constitutes a food receptacle and it is in this space that the tea leaves are placed. An auxiliary tank is provided and supported by the float above the food receptacle and also preferably above the normal level of the water in the cooking vessel. As here shown, the tank C fits in the upper end of the cylinder B and it has a bottom which is so perforated as to allow the water of the tank to slowly discharge. I prefer to form a single hole $c^3$ in the center of the bottom made of such size that it will discharge the contents of the tank in the exact time required for the tea to steep or the food to cook.

Means are provided for directing the overflow of the tank C into the body of the cylinder B and for this purpose I here show a series of holes $c^2$ around the upper edge of the tank C and the tank is somewhat smaller in diameter than the cylinder, leaving a space between the two which allows the water overflowing from the tank to run down into the cylinder.

From what has been said the operation of my tea infuser will be understood. The auxiliary tank C is removed, tea is placed in the cylinder and tank C then inserted in the upper end of the cylinder. The cylinder is now inserted in the mouth of the vessel A and boiling water is poured into tank C the bulk of it overflowing and partially filling the vessel A. The weight of the water in the tank is sufficient to submerge the float and the tea leaves and the latter are in contact with the body of water in the main tank through the lateral perforations of the cylinder and thus the whole body of water takes up the soluble elements of the tea and forms the regular tea infusion. When the water is all out of the tank C, or nearly so and the required time has elapsed, the buoyancy of the float lifts the cylinder and raises the tea leaves above the water, leaving an infusion which contains the valuable elements of the tea but which is practically free from tannic acid and other injurious substances. The device acts automatically and as soon as the cylinder is seen to rise out of the mouth of the pot it can be removed and the tea infusion is ready to be poured. It may be kept indefinitely without growing stronger or changing its quality because the leaves are not present in the infusion.

It is evident that the float may be otherwise guided vertically than by means of the cylinder passing through the mouth of the tea kettle, the tank and other parts may be otherwise constructed than as here illustrated especially when the device is made to cook eggs or other forms of food.

I claim;

1. A tea infuser consisting of a main tank, a float in said main tank, a tea receptacle supported by said float and communicating with the main tank and an auxiliary tank above the tea receptacle and supported by said float and having a restricted outlet adapted to slowly discharge its contents.

2. A tea infuser consisting of a main tank, a cylinder having perforated walls and adapted to enter the mouth of the main tank, a float on the lower end of said cylinder and an auxiliary tank on the upper end of said cylinder leaving an intervening food receptacle connecting with the main tank through the perforations of the cylinder, said auxiliary tank having a contracted opening adapted to slowly discharge its contents.

3. A tea infuser consisting of a main tank, a cylinder having perforated walls adapted to enter said main tank, an air chamber formed on the lower end of said cylinder, an auxiliary tank on the upper end of said cylinder leaving an intervening food receptacle communicating with the main tank through the perforations of said cylinder, said auxiliary tank having a contracted outlet adapted to slowly discharge its contents.

4. A tea infuser consisting of a main tank, a cylinder having perforated walls and adapted to enter the mouth of said main tank, an air chamber on the lower end of said cylinder, a removable tank fitting in the upper end of said cylinder and leaving an intervening tea receptacle communicating with the main tank through the perforations of the cylinder, said removable tank having overflow openings near its upper end and a contracted outlet adapted to slowly discharge its contents.

5. A tea infuser consisting of a main tank, a cylinder having perforated walls and adapted to enter the mouth of said main tank, an air chamber on the lower end of said cylinder, a removable tank of smaller diameter than the cylinder fitting in the upper end thereof and leaving an intervening tea receptacle, said removable tank having overflow openings near its upper end and a contracted outlet adapted to slowly discharge its contents.

In testimony whereof I have affixed my signature, in presence of two witnesses.

ELMER N. BACHELDER.

Witnesses:
S. W. BATES,
PERCY M. ANDREWS.